United States Patent
Mimura et al.

[19]

[11] Patent Number: 6,083,607
[45] Date of Patent: Jul. 4, 2000

[54] TRIANGULAR PYRAMIDAL CUBE CORNER TYPE RETROREFLECTIVE SHEET

[75] Inventors: Ikuo Mimura; Keiji Adachi, both of Sano, Japan

[73] Assignee: Nippon Carbide Kogyo Kabushiki Kaisha, Tokyo, Japan

[21] Appl. No.: 09/091,218

[22] PCT Filed: Oct. 16, 1997

[86] PCT No.: PCT/JP97/03743

§ 371 Date: Jun. 18, 1998

§ 102(e) Date: Jun. 18, 1998

[87] PCT Pub. No.: WO98/18028

PCT Pub. Date: Apr. 30, 1998

[30] Foreign Application Priority Data

Oct. 18, 1996 [JP] Japan .................................. 8-295907

[51] Int. Cl.[7] ......................................................... B32B 3/28
[52] U.S. Cl. .......................... 428/167; 428/141; 428/156; 362/297; 362/341; 362/529; 362/530
[58] Field of Search ..................................... 362/297, 341, 362/529, 530; 428/156, 167, 141

[56] References Cited

U.S. PATENT DOCUMENTS

| | | |
|---|---|---|
| 2,481,757 | 9/1949 | Jungersen . |
| 3,712,706 | 1/1973 | Stamm . |
| 3,830,682 | 8/1974 | Rowland . |
| 5,138,488 | 8/1992 | Szczech . |
| 5,696,627 | 12/1997 | Benson et al. ............................ 359/529 |
| 5,706,132 | 1/1998 | Nestegard et al. ....................... 359/529 |
| 5,721,640 | 2/1998 | Smith et al. ............................. 359/530 |
| 5,764,413 | 6/1998 | Smith et al. ............................. 359/530 |
| 5,831,767 | 11/1998 | Benson et al. ............................ 359/529 |
| 5,840,405 | 11/1998 | Shusta et al. ............................ 428/156 |
| 5,840,406 | 11/1998 | Nilsen . |
| 5,844,712 | 12/1998 | Caroli ....................................... 359/529 |
| 5,889,615 | 3/1999 | Dreyer et al. ............................ 359/529 |
| 5,898,523 | 4/1999 | Smith et al. ............................. 359/530 |
| 5,914,812 | 6/1999 | Benson et al. ........................... 359/529 |
| 5,981,032 | 11/1999 | Smith et al. ............................. 428/167 |
| 5,988,820 | 11/1999 | Huang et al. ............................ 359/530 |

FOREIGN PATENT DOCUMENTS

| | | |
|---|---|---|
| 0137736 | 4/1985 | European Pat. Off. . |
| 0548280 | 6/1993 | European Pat. Off. . |
| 44-13395 | 6/1969 | Japan . |
| 50-47591 | 4/1975 | Japan . |

*Primary Examiner*—Elizabeth M. Cole
*Assistant Examiner*—Arti R. Singh
*Attorney, Agent, or Firm*—Sherman and Shalloway

[57] ABSTRACT

The present invention relates to a triangular-pyramidal cube-corner retroreflective sheet constituted with triangular-pyramidal cube-corner retroreflective elements useful for signs including traffic signs and construction work signs, license plates of automobiles and motorcycles, safety materials of clothing and life preservers, markings of signboards, and reflectors of visible-light, laser-beam, and infrared-ray reflective sensors, in which a lateral face (c) using one of the base edge (x) of triangular-pyramidal reflective elements arranged in a close-packed state on a base plane (X-X') and facing each other by sharing the base edge (x) on the base plane (X-X') as one side is pentagonal, other faces (a, b) sharing one of ridge lines starting with apex (H) of the triangular-pyramidal reflective elements are quadrangular, and the height (h) from the apex (H) up to the base plane (X-X') is substantially larger than the height (h') from the apex (H) up to a substantially horizontal plane (virtual plane Z-Z') including the base edges (z, w) of other lateral faces (a, b) of the triangular-pyramidal reflective elements.

10 Claims, 5 Drawing Sheets

FIG. 8

TRIANGULAR PYRAMIDAL CUBE CORNER TYPE RETROREFLECTIVE SHEET

CROSS-REFERENCE TO RELATED APPLICATION

This is the Section 371 National Phase application of International Application PCT/JP97/03743, filed Oct. 16, 1997.

TECHNICAL FIELD

The present invention relates to a triangular-pyramidal cube-corner retroreflective sheet having a novel structure. More minutely, the present invention relates to a cube-corner retroreflective sheet in which triangular-pyramidal reflective elements having a novel structure are arranged in a close-packed state.

Still more minutely, the present invention relates to a cube-corner retroreflective sheet constituted with triangular-pyramidal cube-corner retroreflective elements (hereafter referred to as triangular-pyramidal reflective elements or merely, elements) useful for signs including traffic signs and construction work signs, license plates of automobiles and motorcycles, safety materials of clothing and life preservers, markings of signboards, and reflectors of visible-light, laser-beam, and infrared-ray reflective sensors.

Still more minutely, the present invention relates to a triangular-pyramidal cube-corner retroreflective sheet in which triangular-pyramidal cube-corner retroreflective elements protruded on one common base plane (X-X') are arranged on the base plane in a close-packed state so as to face each other by sharing one common base edge on the base plane (X-X') with each other, the base plane (X-X') is one common plane including a plurality of the base edges (x, x, . . . ) shared by the triangular-pyramidal retroreflective elements, two these triangular-pyramidal retroreflective elements facing each other form a pair of elements having the substantially same shape facing each other so as to be respectively substantially symmetric to planes (Y-Y', Y-Y', . . . ) vertical to the base plane including the common base edges (x, x, . . . ) on the base plane (X-X'), the triangular-pyramidal retroreflective elements are formed with substantially same pentagonal lateral faces ($c_1$, $c_2$) using the common base edges (x, x, . . . ) as one side and substantially same quadrangular lateral faces ($a_1$, $b_1$; $a_2$, $b_2$) substantially perpendicularly intersecting the face $c_1$ or $c_2$ using two upper sides of the face $c_1$ or $c_2$ using apexes ($H_1$, $H_2$) of the triangular-pyramidal retroreflective elements as starting points as one side respectively, sharing one of ridge lines of the triangular-pyramidal retroreflective elements and using the ridge line as one side and the height (h') from the apexes ($H_1$, $H_2$) of the triangular-pyramidal retroreflective elements up to the base plane (X-X') including the base edges (x, x, . . . ) of the pentagonal lateral faces ($c_1$, $c_2$) of the triangular-pyramidal retroreflective elements is substantially larger than the height (h) from the apexes ($H_1$, $H_2$) of the triangular-pyramidal retroreflective elements up to a substantially horizontal plane (virtual plane Z-Z') including base edges (z, w) of other lateral faces ($a_1$, $b_1$; $a_2$, $b_2$) of the triangular-pyramidal retroreflective elements.

BACKGROUND ART

A retroreflective sheet for reflecting incoming light toward a light source has been well known so far and the sheet using its retroreflective characteristic is widely used in the above fields. Particularly, a cube-corner retroreflective sheet using the retroreflective theory of a cube-corner retroreflective element such as a triangular-pyramidal reflective element is extremely superior to a conventional retroreflective sheet using a micro glass beads in retroreflectivity and its purpose has been expanded year by year because of its superior retroreflective performance.

However, though a conventionally-publicly-known triangular-pyramidal retroreflective element shows a preferable retroreflectivity when the angle formed between the optical axis of the element (axis passing through the apex of the triangular pyramid of the triangular-pyramidal retroreflective element equally separate from three faces constituting a triangular-pyramidal cube-corner retroreflective element and intersecting each other at an angle of 90°) and an incident light (the angle is hereafter referred to as entrance angle) is kept in a small range, the retroreflectivity rapidly deteriorates as the entrance angle increases (that is, the entrance angle characteristic deteriorates). Moreover, a light entering the triangular-pyramidal retroreflective element face at an angle less than a critical angle ($\alpha_c$) satisfying an internal total-reflection condition determined by the ratio between the refractive index of a transparent medium constituting the triangular-pyramidal retroreflective element and the refractive index of air penetrates into the back of the element without totally reflecting on the interface of the element. Therefore, a retroreflective sheet using a triangular-pyramidal reflective element generally has a disadvantage that it is inferior in entrance angularity.

However, because a triangular-pyramidal retroreflective element can reflect light in the light incoming direction almost over the entire surface of the element, reflected light does not reflect by dispersing at a wide angle due to aberration differently from the case of a micro-glass-ball reflective element. However, the narrow dispersion angle of the reflected light practically easily causes a trouble that, when the light emitted from a head lamp of an automobile is retro-reflected on a traffic sign, the retro-reflected light hardly reaches, for example, a driver present at a position distant from the axis of the retro-reflected light. Particularly when the distance between an automobile and a traffic sign decreases, the above trouble more-frequently occurs because the angle formed (observation angle) between the entrance axis of a light ray and the axis (observation axis) connecting a driver and a reflective point increases (that is, the observation angularity deteriorates).

For the above cube-corner retroreflective sheet, particularly for a triangular-pyramidal cube-corner retroreflective sheet, many proposals have been known so far and various improvements and studies are performed.

For example, Jungersen's U.S. Pat. No. 2,481,757 discloses a retroreflective sheet constituted by arranging retroreflective elements of various shapes on a thin sheet and a method for manufacturing the sheet. Triangular-pyramidal reflective elements disclosed in the above U.S. patent include a triangular-pyramidal reflective element in which the apex is located at the center of a base-plane triangle and the optical axis does not tilt and a triangular-pyramidal reflective element in which the apex is not located at the center of a base-plane triangle but the optical axis tilts. Moreover, it is described in the U.S. patent to efficiently reflect light toward an approaching automobile. Furthermore, it is described that the size of a triangular-pyramidal reflective element, that is, the depth of the element is 1/10 in (2,540 μm) or less. Furthermore, FIG. 15 in the U.S. patent illustrates a triangular-pyramidal reflective element whose optical axis tilts in the plus (+) direction similarly to the case of a preferred mode of the present invention. The tilt angle (θ) of the optical axis is estimated as approx. 6.5° when obtaining it from the ratio between the longer edge and shorter edge of the base-triangular plane of the illustrated triangular-pyramidal reflective element.

However, the above Jungersen's U.S. patent does not specifically disclose a very small triangular-pyramidal reflective element shown in the present invention or it does not disclose a size or an optical-axis tilt a triangular-pyramidal reflective element must have in order to show superior observation angularity and entrance angularity.

In this specification, the expression "optical axis tilts in the plus (+) direction" represents, as described later, that the optical axis tilts in the direction in which the difference (q−p) between the distance (q) from the intersection (Q) between the optical axis of the triangular-pyramidal reflective element and the base plane (X-X') of the triangular-pyramidal reflective element up to the base edges (x, x, . . . ) shared by the element pair {the distance (q) is equal to the distance from the intersection (Q) up to a plane (Y-Y') vertical to the base plane (X-X') including the base edges (x, x, . . . ) shared by the element pair} and the distance (p) from the intersection (P) between a perpendicular extended from the apex of the element to the base plane (X-X') and the base plane (X-X') up to the base edges (x, x, . . . ) shared by the element pair becomes plus (+). However, when the optical axis tilts in the direction in which (q−p) becomes minus (−), the expression "optical axis tilts in the minus (−) direction" is hereafter used.

Moreover, Stamm's UP Pat. No. 3,712,706 discloses a retroreflective sheet in which so-called equilateral triangular-pyramidal cube-corner retroreflective elements whose base-plane triangles are equilateral triangles are arranged on a thin sheet so that their base planes are brought into a close-packed state on a common plane. Stamm's U.S. patent improves the problem that a retroreflectivity is deteriorated due to increase of an entrance angle through mirror-reflection by vacuum-coating the reflective surface of a reflective element with a metal such as aluminum and the above trouble that the light incoming at an angle of less than an internal total reflection condition passes through the interface between elements and thereby, it does not retroreflect.

However, because the above Stamm's proposal uses the mirror reflection theory as means for improving the angularity (wide angularity), the proposal easily causes the trouble that the appearance of an obtained retroreflective sheet becomes dark or the reflection brightness easily deteriorates because a metal such as aluminum or silver used for the mirror surface is oxidized due to incoming of water or air while it is used. Moreover, the proposal does not describe means for improving the angularity (wide angularity) by a tilt of an optical axis at all.

Moreover, Hoopman's European Pat. No. 137,736B1 describes a retroreflective sheet in which triangular-pyramidal cube-corner retroreflective elements with a tilted optical axis whose triangular base-plane are isosceles triangles are arranged on a thin sheet so that their base planes are brought into a close-packed state on a common plane. The optical axis of a triangular-pyramidal cube-corner retroreflective element described in the patent tilts in the minus (−) direction inversely to the tilt direction of the optical axis of a preferred triangular-pyramidal reflective element of the present invention and it is described in the patent that the tilt angle of the optical axis is approx. 7° to 13°.

Furthermore, Szczech's U.S. Pat. No. 5,138,488 discloses a retroreflective sheet in which triangular-pyramidal cube-corner retroreflective elements with a tilted optical axis whose base-plane triangles are isosceles triangles are arranged so that the base planes is brought into a close-packed state on a common plane. In the case of the U.S. patent, it is specified that the optical axis of each of the above triangular-pyramidal retroreflective elements tilts in the direction of a side shared by a pair of retroreflective elements facing each other, the tilt angle of the optical axis ranges between 2° and 5°, and the size of each element ranges between 25 μm and 100 μm.

Furthermore, in the case of European Pat. No. 548,280B1 corresponding to the above patent, it is described that the direction of a tilt of an optical axis includes a side common to a pair of elements, the distance between a plane vertical to a common plane and the apex of an element is not equal to the distance between the point where the optical axis of an element intersects the common plane and the vertical plane, the tilt angle of the optical axis of the element ranges between 2° and 5°, and the size of the element ranges between 25 μm and 100 μm.

As described above, in the case of Szczech's European Pat. No. 548,280B1, the tilt of an optical axis ranges between +2° and +5° and between −2° and −5°. In the case of embodiments of the above Szczech's U.S. patent and European patent, however, only triangular-pyramidal retroreflective elements are specifically disclosed which have optical-axis tilt angles of −8.2°, −9.2°, and −4.3° and an element height (h) of 87.5 μm.

The above-described conventionally publicly-known triangular-pyramidal cube-corner retroreflective elements of Jungersen's U.S. Pat. No. 2,481,757. Stamm's U.S. Pat. No. 3,712,706, Hoopman's European Pat. No. 137,736B1 and Szczech's U.S. Pat. No. 5,138,488 and European Pat. No. 548,280B1 are common in that the base planes of a plurality of triangular-pyramidal reflective elements serving as cores of entrance and reflection of light are present on the same plane. Every retroreflective sheet constituted with triangular-pyramidal reflective elements whose base planes are present on the same plane is inferior in entrance angularity, that is, every retroreflective sheet has a disadvantage that retroreflective brightness rapidly decreases when the entrance angle of a light to the triangular-pyramidal reflective elements increases.

In general, high brightness, that is, the height (magnitude) and angularity (wide angularity) of a reflection brightness represented by the reflection brightness of the light incoming from the front of a triangular-pyramidal cube-corner retroreflective sheet are required for the sheet as optical characteristics. Moreover, three performances such as observation angularity, entrance angularity, and rotational angularity are requested for the angularity (wide angularity) of the retroreflective sheet.

As described above, every retroreflective sheet constituted with conventionally publicly-known triangular-pyramidal cube-corner retroreflective elements has a low entrance angularity and has no satisfied observation angularity in general. However, the present inventor et al. found through a ray tracing simulation that it is possible to improve the entrance angularity of the retroreflective sheet constituted with the triangular-pyramidal reflective elements by making the depth (h') of a plane (plane c) having one base edge on the base plane (X-X') of the triangular-pyramidal reflective elements from the apexes ($H_1$, $H_2$) of the elements {the depth (h') is equal to the height of the apexes ($H_1$, $H_2$) from the base plane (X-X')} substantially larger than the depth (h) of a plane (virtual plane Z-Z') including the base edges (z, w) of two planes (plane a, plane b) substantially perpendicularly intersecting the planes c of the triangular-pyramidal reflective elements.

DISCLOSURE OF THE INVENTION

Still more minutely, the present invention is a triangular-pyramidal cube-corner retroreflective sheet in which triangular-pyramidal cube-corner retroreflective elements protruded on one common base plane (X-X') are arranged on the base plane in a close-packed state so as to face each other by sharing one common base edge on the base plane (X-X') with each other, the base plane (X-X') is one common plane including a plurality of the base edges (x, x, . . . ) shared by the triangular-pyramidal retroreflective elements, two these triangular-pyramidal retroreflective elements facing each other form an element pair of substantially same shapes facing each other so as to be respectively substantially symmetric to planes (Y-Y', Y-Y', . . . ) vertical to the base plane including the common base edges (x, x . . . ) on the base plane (X-X'), the triangular-pyramidal retroreflective elements are formed with substantially same pentagonal lateral faces ($c_1$, $c_2$) using the common base edges (x, x, . . . ) as one side and substantially same quadrangular lateral faces ($a_1$, $b_1$; $a_2$, $b_2$) substantially perpendicularly intersecting the face $c_1$ or $c_2$ using two upper sides of the face $c_1$ or $c_2$ using the apexes ($H_1$, $H_2$) of the triangular-pyramidal retroreflective elements as starting points as one side respectively, sharing one of ridge lines of the triangular-pyramidal retroreflective elements and using the ridge line as one side and the height (h') from the apexes ($H_1$, $H_2$) of the triangular-pyramidal retroreflective elements up to the base plane (X-X') including the base edges (x, x, . . . ) of the pentagonal lateral faces ($c_1$, $c_2$) of the triangular-pyramidal retroreflective elements is substantially larger than the height (h) from the apexes ($H_1$, $H_2$) of the triangular-pyramidal retroreflective elements up to a substantially horizontal plane (virtual plane Z-Z') including base edges (z, w) of other lateral faces ($a_1$, $b_1$; $a_2$, $b_2$) of the triangular-pyramidal retroreflective elements.

A more preferable triangular-pyramidal cube-corner retroreflective sheet of the present invention is characterized in that triangular-pyramidal cube-corner retroreflective elements protruded on one common base plane (X-X') are arranged in a close-packed state so as to face each other by sharing one common base edge on the base plane (X-X'), the base plane (X-X') is a common plane including the base edges (x, x, . . . ) shared by the triangular-pyramidal reflective elements, two these triangular-pyramidal reflective elements facing each other form a pair of substantially-same-shape elements facing each other so as to be respectively substantially symmetric to planes (Y-Y', Y-Y', . . . ) vertical to the base plane including the common base edges (x, x, . . . ) on the base plane (X-X'), lateral faces ($c_1$, $c_2$) of the triangular-pyramidal reflective elements using the common base edges (x, x, . . . ) as one side are continuously arranged along the common base edges by respectively forming a substantially same pentagon, two other lateral faces ($a_1$, $b_1$ and $a_2$, $b_2$) constituting the triangular-pyramidal reflective elements respectively form a substantially same quadrangular lateral face using the two upper sides of the face $c_1$ or $c_2$ using the apexes ($H_1$, $H_2$) of the triangular-pyramidal reflective elements as starting points as one side and sharing one of the ridges of the triangular-pyramidal reflective elements and using the ridge as one side, a plane (virtual plane Z-Z') including base edges (z, w) of the lateral faces ($a_1$, $b_1$) formed by the fact that the lateral faces ($a_1$, $b_1$) of the quadrangle intersect the corresponding quadrangular lateral face ($a_2$ or $b_2$) of other triangular-pyramidal reflective elements adjacent to the lateral faces ($a_1$, $b_1$) is substantially parallel with the base plane (X-X') and located substantially upper than the base plane (X-X'), and the optical axis of the triangular-pyramidal reflective elements forms at least an angle of 3° from the vertical plane (Y-Y') in the direction in which the difference (q–p) between the distance (q) from the intersection between the optical axis of the triangular-pyramidal reflective elements and the base plane (X-X') up to the base edges (x, x, . . . ) shared by the element pair and the distance (p) from the intersection (P) between a perpendicular extended from the apexes ($H_1$, $H_2$) of the elements to the base plane (X-X') and the base plane (X-X') up to the base edges (x, x, . . . ) shared by the elements becomes plus.

The present invention is more minutely described below by properly referring to the accompanying drawings.

DETAILED DESCRIPTION OF THE INVENTION

Before explaining the present invention, a conventional publicly-known art is first described below.

Figure 1:
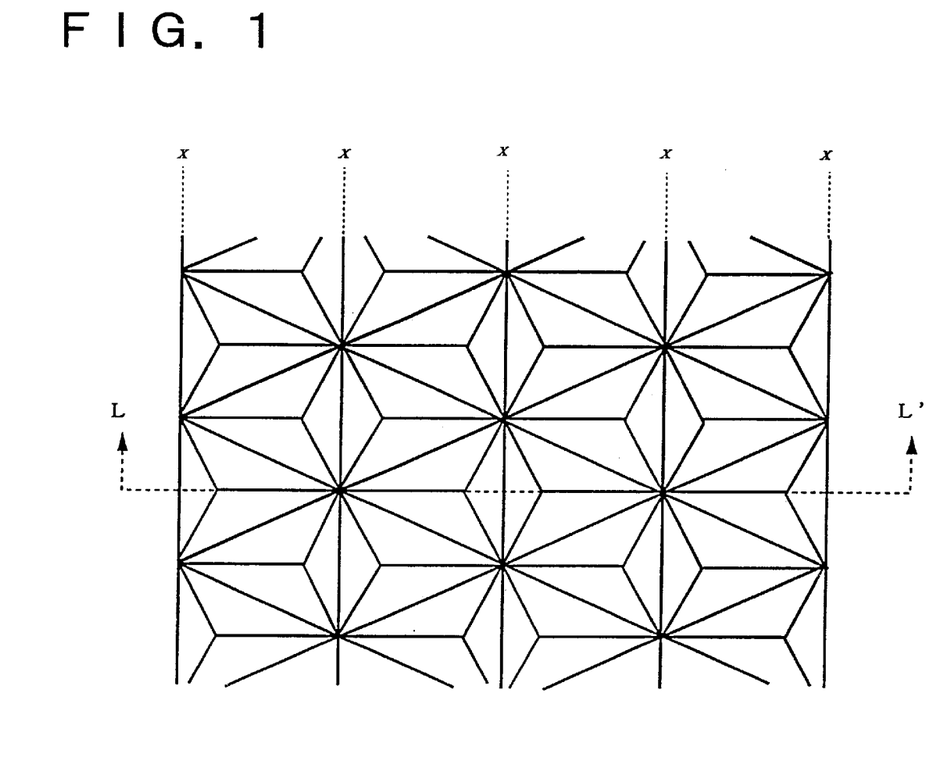
FIG. 1 is a top view of triangular-pyramidal cube-corner retroreflective elements of the prior art.
Figure 2:
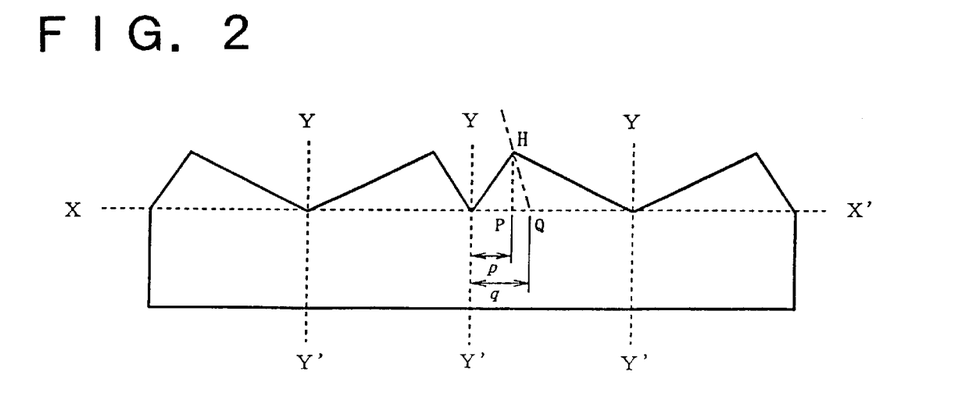
FIG. 2 is a sectional view of triangular-pyramidal cube-corner retroreflective elements of the prior art.

FIGS. 1 and 2 show a top view and a sectional view for explaining triangular-pyramidal cube-corner retroreflective elements of the prior art in order to compare the elements with triangular-pyramidal cube-corner retroreflective elements of the present invention. In FIG. 1, triangular-pyramidal cube-corner retroreflective elements protruded onto a common plane share common base edges (x, x, . . . ) and base planes of the triangular-pyramidal cube-corner retroreflective elements are arranged on one common plane (X-X') in a close-packed state, as a pair of elements facing each other so as to be symmetric to a plane (Y-Y') vertical to the common plane (X-X') including the base edges (x, x, . . . ) shared by the retroreflective elements.

Moreover, FIG. 2 shows a sectional view of the triangular-pyramidal reflective elements, taken along the line (L-L') of the element group shown in FIG. 1. Optical axes of these element pairs arranged on triangular-pyramidal cube-corner retroreflective sheets tilt in the directions opposite to each other. The optical axes tilt from the vertical plane (Y-Y') in the direction in which the difference (q–p) between the distance (p) from the intersection (P) between a perpendicular extended from the apexes ($H_1$, $H_2$) of the elements to the base plane (X-X') and the base plane (X-X') up to the base edges (x, x, . . . ) shared by the elements and the distance (q) from the intersection (Q) between an optical axis and the base plane up to the base edges (x, x, . . . ) shared by the elements becomes plus.

Figure 3:
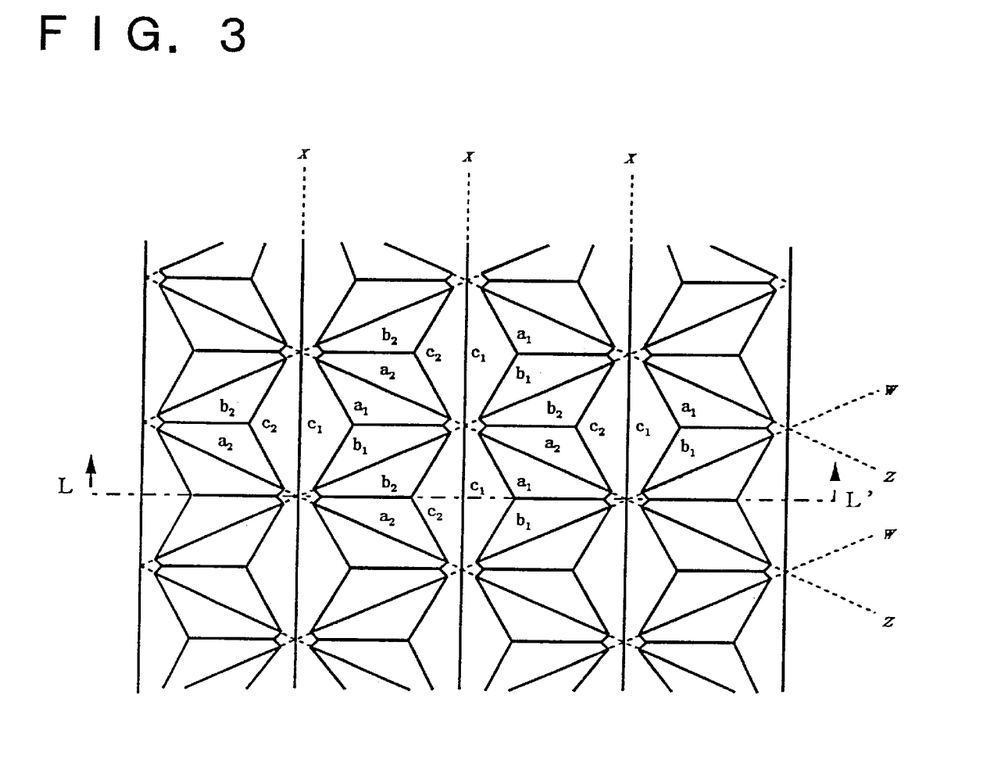
FIG. 3 is a top view of triangular-pyramidal cube-corner retroreflective elements for explaining the present invention.
Figure 4:
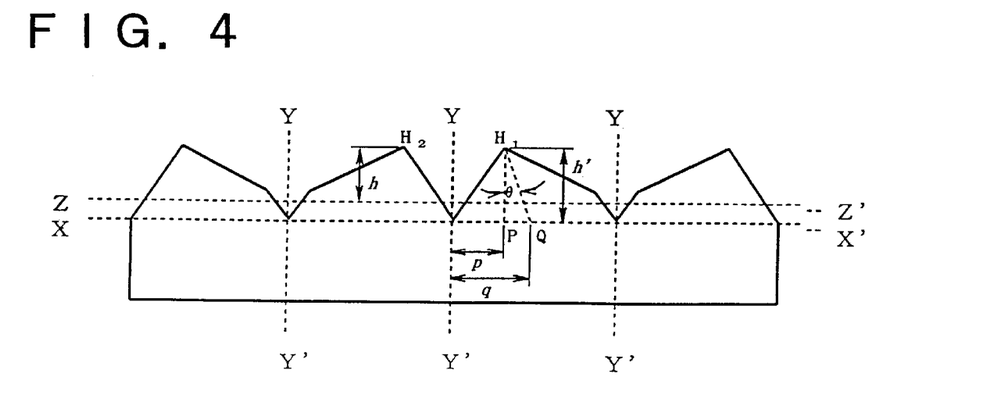
FIG. 4 is a sectional view of triangular-pyramidal cube-corner retroreflective elements for explaining the present invention.

FIGS. 3 and 4 show a top view and a sectional view for explaining triangular-pyramidal cube-corner retroreflective elements of the present invention. FIG. 3 shows that the triangular-pyramidal reflective elements of the present invention protruded onto one common base plane (X-X') are arranged in a close-packed state by sharing one of common base edges (x, x, . . . ) on the base plane (X-X') and facing each other. Moreover, FIG. 4 shows a sectional view of triangular-pyramidal reflective elements of the present invention, taken along the line (L-L') of the element group shown in FIG. 3. As shown in FIG. 3, triangular-pyramidal reflective elements of the present invention are formed with pentagonal lateral faces ($c_1$, $c_2$) facing each by sharing one base edge (x) on the base plane (X-X') and substantially same quadrangular lateral faces ($a_1$, $b_1$ and $a_2$, $b_2$) substantially perpendicularly intersecting the face $c_1$ or $c_2$ using two upper sides of the face $c_1$ or $c_2$ using the apexes ($H_1$, $H_2$) of the triangular-pyramidal reflective elements as starting points as one side respectively and sharing one of the ridge lines of the triangular-pyramidal reflective elements and using the ridge line as one side.

As shown in FIG. 3, triangular-pyramidal reflective elements of the present invention are arranged in a close-packed state in repetitive patterns by forming a pair of elements having the substantially same shape, sharing one base edge (x) on the base plane (X-X'), and facing each other so as to be substantially symmetric. Therefore, the common base edge (x) forms a continuous straight line. Moreover, a plurality of base edges (x) shared by adjacent groups of other triangular-pyramidal reflective pairs are parallel with the straight line constituting the base edge (x) and form a parallel straight line group having equal repetitive pitches.

Therefore, because the lateral faces ($c_1$, $c_2$) of triangular-pyramidal reflective elements of the present invention share the base edge (x) and face each other and the base edge (x) forms a continuous straight line, the face $c_1$ forms a continuous plane and the face $c_2$ also forms a continuous plane. Moreover, the quadrangular lateral face observed along the line x in FIG. 3 (small quadrangular lateral face between the faces $a_1$ and $b_1$ and two faces $c_2$)) are also located on the plane on the ling x formed by the face $c_1$ or $c_2$. As a result, the plane formed with the face $c_1$ or $c_2$ and the lateral face having the small quadrangle is present on the continuous straight line and forms the same lateral face as the face c forming a groove with a V-shaped cross section.

The term "substantial" in this specification is an expression including even a very small difference. For example, "substantially symmetric" and "substantially same shape" are expressions including a case in which corresponding side and/or angle is and/or are completely the same and the value of the side or angle is different very slightly, for example, by approx. 1% or less of the value.

Figure 5:
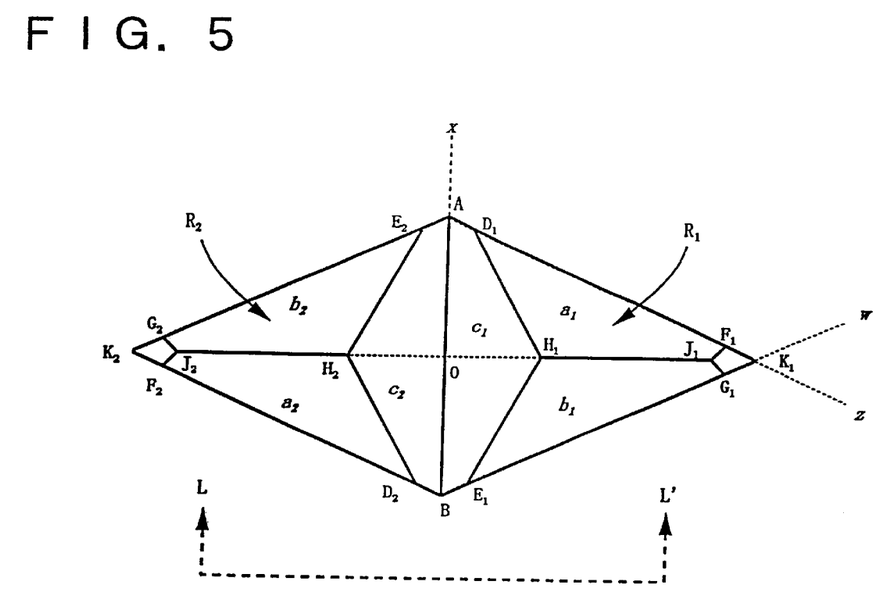
FIG. 5 is an enlarged top view of a pair of triangular-pyramidal reflective elements for explaining the present invention.
Figure 6:
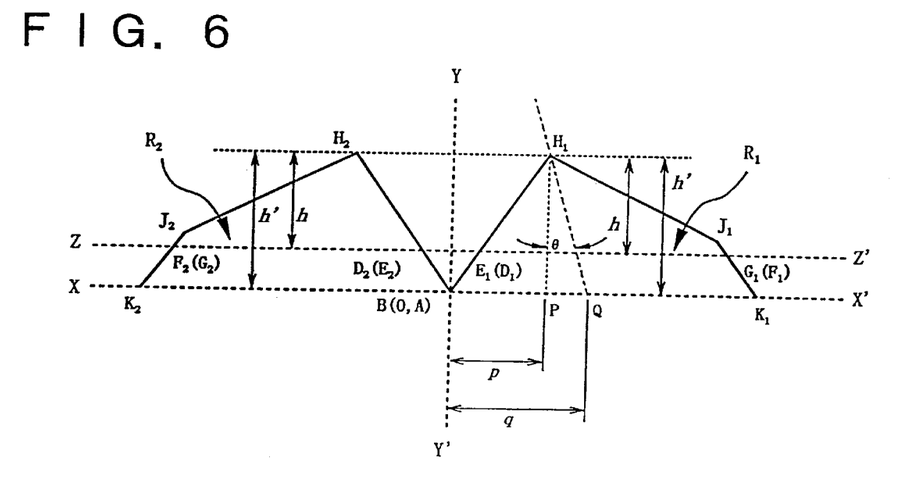
FIG. 6 is an enlarged sectional view of a pair of triangular-pyramidal reflective elements for explaining the present invention.

To make the present invention easily be understood, the enlarged top view of a pair of triangular-pyramidal reflective elements shown as in FIG. 3 is shown as FIG. 5 and the side view viewed from the direction of the arrow shown by the line L-L' in FIG. 3 is shown as FIG. 6.

In FIG. 6, the face $c_1$ of an element $R_1$ at the right of a pair of triangular-pyramidal reflective elements of the present invention (that is, the element shown by in FIG. 3) is a pentagonal plane enclosed by points $H_1$-$D_1$-A-B-$E_1$, the face $a_1$ is a quadrangular plane enclosed by points $H_1$-$J_1$-$F_1$-$D_1$, the face $b_1$ is a quadrangular plane enclosed by points $H_1$-$J_1$-$G_1$-$E_1$, the faces $a_1$ and $b_1$ have substantially the same shape, and the faces $c_1$, $a_1$, and $b_1$ substantially perpendicularly intersect each other. Moreover, the base plane of a right triangular-pyramidal reflective element $R_1$ shown by a plane A-B-$K_1$ forms a part of the common base plane (X-X').

In FIG. 6, a left triangular-pyramidal reflective element shown by $R_2$ corresponds to the left triangular-pyramidal reflective element of the above elements shown by in FIG. 3 and its base plane is shown by A-B-$K_2$. The triangular-pyramidal reflective element $R_2$ whose base plane is shown by A-B-$K_2$ has the same shape as the right reflective element $R_1$ whose base plane is shown by A-B-$K_1$ and the elements $R_1$ and $R_2$ are present at the both sides of the base (A-B) (this is present on the common base edges x in FIG. 3) shared by the both elements $R_1$ and $R_2$, and the left element $R_2$ has a shape obtained by rotating the right element $R_1$ about the center (O) of the base (A-B) shared by the both elements $R_1$ and $R_2$ by 180° on the base plane X-X'.

Therefore, in FIG. 5, the face $c_2$ shown by the points $H_2$-$D_2$-B-A-$E_2$ of the left element $R_2$, the face $a_2$ shown by the points $H_2$-$J_2$-$F_2$-$D_2$, and the face $b_2$ shown by the points $H_2$-$J_2$-$G_2$-$E_2$ respectively substantially have the same shape as the faces $c_1$, $a_1$, and $b_1$ of the right element $R_1$ and the faces $c_2$, $a_2$, and $b_2$ also substantially perpendicularly intersect each other.

Therefore, in FIG. 6 which is a side view viewed from the direction of the line L-L' in FIG. 5, the side view of the right element $R_1$ shown by the points B-$H_1$-$J_1$-$K_1$ and that of the left element $R_2$ shown by the points B-$H_2$-$J_2$-$K_2$ are substantially symmetric to right and left and have the same shape.

As shown in FIG. 6, apexes of the triangular-pyramidal reflective elements ($R_1$, $R_2$) of the present invention are shown by $H_1$ and $H_2$ and the height of the apexes ($H_1$, $H_2$) from the common base plane (X-X') is shown by h'.

As shown in FIGS. 5 and 6, the height h' corresponds to the depth of a V-shaped trough formed by the faces $c_1$ and $c_2$ facing each other of the triangular-pyramidal reflective elements $R_1$ and $R_2$ of the present invention from a plane (virtual plane) including the apexes $H_1$ and $H_2$ of the elements.

Moreover, as clearly understood from FIGS. 5 and 6, the quadrangular lateral faces $a_1$, $b_1$ and $a_2$, $b_2$ of the triangular-pyramidal reflective elements $R_1$ and $R_2$ of the present invention substantially have the same shape, base edges $F_1$-$D_1$ and $G_1$-$E_1$ of the lateral faces $a_1$ and $b_1$ of the element $R_1$ and base edges $F_2$-$D_2$ and $G_2$-$E_2$ of the lateral faces $a_2$ and $b_2$ of the element $R_2$ are present on a virtual plane (Z-Z') forming the same plane, and the height from the virtual plane Z-Z' up to a plane (virtual plane) including the apexes $H_1$ and $H_2$ of the elements $R_1$ and $R_2$ are shown by h in FIG. 6.

Therefore, the depth of troughs for the lateral faces $a_1$, $b_1$ and $a_2$, $b_2$ of the triangular-pyramidal reflective elements $R_1$ and $R_2$ of the present invention to respectively form with corresponding lateral faces of other adjacent elements from a plane including the apexes $H_1$ and $H_2$ (the bottoms of the troughs are bases of the lateral faces $a_1$, $b_1$ and $a_2$, $b_2$) is shown by h.

The triangular-pyramidal reflective elements ($R_1$, $R_2$, . . . ) of the present invention are characterized in that the depth (h') of the trough formed with the faces $c_1$ and $c_2$ is larger than the depth (h) of the troughs formed by the faces $a_1$, $b_1$ and $a_2$, $b_2$ (and planes corresponding to these faces).

Moreover, as shown in FIGS. 3 and 5, base edges of faces $a_1$ and $a_2$ of the triangular-pyramidal reflective elements $R_1$ and $R_2$ of the present invention are present on a common line w, base edges of the faces $b_1$ and $b_2$ are located on a common line z, and base edges of the faces $c_1$ and $c_2$ are located on a common line x.

In the case of the present invention, when assuming the height of the apexes ($H_1$, $H_2$) of triangular-pyramidal reflective elements of the present invention from the base plane (X-X') as h' and the height of the apexes ($H_1$, $H_2$) from the virtual plane (Z-Z') as h, a cube-corner retroreflective sheet whose value of h'/h ranges between 1.05 and 1.5 is preferable, particularly a cube-corner retroreflective sheet whose value of h'/h ranges between 1.07 and 1.4 is preferable.

Moreover, as shown in FIGS. 3 to 6, a plurality of triangular-pyramidal reflective elements of the present invention are arranged on the base plane (X-X') including the common base edges (x, x, . . . ) in a close-packed state by sharing the base edges (x, x, . . . ) shared by two corresponding faces c of the triangular-pyramidal reflective elements and facing each other as already described.

The present invention is described below by referring to FIGS. 3 to 6. That is, a cube-corner retroreflective sheet is preferable which is characterized in that triangular-pyramidal cube-corner retroreflective elements protruded onto one common base plane (X-X') are arranged on the base plane (X-X') in a close-packed state by sharing one common base edge on the base plane (X-X') and facing each other, the base plane (X-X') is one common plane including a plurality of base edges (x, x, . . . ) shared by the triangular-pyramidal reflective elements, two these triangular-pyramidal reflective elements facing each other form a pair of substantially-same-shape elements facing each other so as to be respectively substantially symmetric to planes (Y-Y', Y-Y', . . . ) vertical to the base plane (X-X') including the common base edges (x, x, . . . ) on the base plane (X-X'), lateral faces ($c_1$, $c_2$) using the base edges (x, x, . . . ) shared by the triangular-pyramidal reflective elements as one side form substantially same pentagons and are continuously arranged along the common base edges, two other lateral faces ($a_1$, $b_1$ and $a_2$, $b_2$) forming the triangular-pyramidal reflective elements form substantially same quadrangular lateral faces by using two upper sides of the face $c_1$ of $c_2$ using the apexes ($H_1$, $H_2$) of the triangular-pyramidal reflective elements as starting points and sharing one of the ridge lines of the triangular-pyramidal reflective elements and using the ridge line as one side, a plane (virtual plane Z-Z') including base edges (z, w) of the lateral faces ($a_1$, $b_1$) formed by the fact that the quadrangular lateral faces ($a_1$, $b_1$) intersect the quadrangular lateral face ($a_2$ or $b_2$) corresponding to other triangular-pyramidal reflective elements adjacent to the lateral faces ($a_1$ and $b_1$) is substantially parallel with the base plane (X-X') and located substantially upper than the base plane (X-X') of the triangular-pyramidal reflective elements, and the optical axis of the triangular-pyramidal reflective elements tilts by an angle ($\theta$) of at least 3° from the vertical plane (Y-Y') in a direction in which the difference (q–p) between the distance (q) from the intersection (Q) between the optical axis of the triangular-pyramidal reflective elements and the base plane (X-X') up to the base edges (x, x, . . . ) shared by the element pair and the distance (p) from the intersection (P) between a perpendicular extended from the apexes (H, $H_2$) of the triangular-pyramidal reflective elements to the base plane (X-X') and the base plane (X-X') up to the base edges (x, x, . . . ) shared by the element pair becomes plus.

Moreover, the present invention is described below by referring to FIG. 6. That is, an angle ($\theta$) formed between an optical axis passing through the apex $H_1$ of the triangular-pyramidal reflective element $R_1$ and a perpendicular ($H_1$-P) extended from the apex $H_1$ to the base plane (X-X') {this can be also considered as the plane (Y-Y') vertical to the base plane (X-X')} is referred to as optical-axis tilt angle and it is preferable to set an optical-axis tilt angle ($\theta$) to at least 3° in a direction in which the difference (q–p) becomes plus.

Furthermore, in the case of the present invention, a cube-corner retroreflective sheet is preferable in which the optical axis of the triangular-pyramidal reflective elements tilts by 4° to 12° from the plane (Y-Y') in a direction in which the difference (q–p) between the distance (p) from the intersection (P) between a perpendicular extended from the apexes ($H_1$, $H_2$) of the triangular-pyramidal reflective elements to the base plane (X-X') and the intersection (P) up to the base edges (x, x, . . . ) shared by the element pair and the distance (q) from the intersection (Q) between the optical axis of the triangular-pyramidal reflective elements and the base plane (X-X') up to the base edges (x, x, . . . ) shared by the element pair becomes plus, particularly a cube-corner reflective sheet is preferable in which the optical axis tilts by 5° to 10° from the vertical plane (Y-Y') in a direction in which the difference (q–p) becomes plus.

Furthermore, in the case of the present invention, a cube-corner retroreflective sheet is preferable which has triangular-pyramidal reflective elements in which the distance (h) from a plane (virtual plane Z-Z') including a plurality of base edges (z, w) of lateral faces ($a_1$, $b_1$ or $a_2$, $b_2$) formed by the fact that substantially same quadrangular lateral faces ($a_1$, $b_1$) sharing one ridge line using the apex of a plurality of triangular-pyramidal cube-corner retroreflective elements protruded onto a common base plane (X-X') as a starting point and using the ridge line as one side intersect corresponding quadrangular lateral faces ($a_2$ or $b_2$) of other triangular-pyramidal reflective element adjacent to the lateral faces ($a_1$, $b_1$) up to the apexes ($H_1$, $H_2$) of the triangular-pyramidal reflective elements ranges 50 $\mu$m and 400 $\mu$m, particularly between 60 $\mu$m and 200 $\mu$m, more particularly between 70 $\mu$m and 10 $\mu$m.

Because the height (h') from the apexes ($H_1$, $H_2$) of triangular-pyramidal reflective elements of the present invention up to the common base plane (X-X') is substantially larger than the height (h) from the apexes ($H_1$, $H_2$) of the triangular-pyramidal reflective elements up to the virtual plane (Z-Z'), various improvements of optical characteristics are obtained.

These improvements can be achieved because h' is substantially larger than h and thereby, the area of the face $c_1$ can be increased compared to the lateral face of $c_1$ of the prior art. Particularly, the light incoming at an angle almost vertically to the face $c_1$, in other words, in the case of a large entrance angle, the entrance angularity is remarkably improved because the area of the face $c_1$ is increased.

Moreover, the above improvements of the optical characteristics by increase of the area of the face $c_1$ are particularly remarkable in the case of a triangular-pyramidal reflective element having a tilted optical axis, particularly when the optical axis of the triangular-pyramidal reflective element tilts in a direction in which the difference (q–p) between the distance (p) and the distance (q) becomes plus.

In the case of the present invention, when an optical axis tilts so that the difference (q–p) becomes plus, the entrance angularity is particularly improved. In the case of a triangular-pyramidal reflective element having a tilted optical axis according to the prior art, however, there is a disadvantage that areas of the lateral faces ($c_1$, $c_2$) having the common base edge (x) become smaller than those of the lateral faces ($c_1$, $c_2$) before tilted because a normal triangular-pyramidal reflective element whose optical axis is not tilted tilts the optical axis so that the difference (q–p) becomes plus and thus, the probability of retroreflection due to trihedral reflection decreases. For the incoming light to reflect on three lateral faces and efficiently retro-reflect, it is preferable that the areas of three lateral faces are equal. In the case of a triangular-pyramidal reflective element with a tilted optical axis according to the prior art, however, the probability of retroreflection due to trihedral reflection is decreased because areas of the lateral faces ($c_1$, $c_2$) having a common base decrease compared to two other faces ($a_1$, $b_1$ and $a_2$, $b_2$) as a tilt angle increases. Therefore, the retroreflective performance (front reflection brightness) of the light incoming from the front is deteriorated and moreover, the retroreflective performance (entrance angularity) when a tilt angle increases is deteriorated.

When an optical axis tilts so that (q–p) becomes plus, areas of the lateral faces ($c_1$, $c_2$) of a triangular-pyramidal reflective element decrease to approx. 91% when the optical-axis tilt angle ($\theta$) is +3°, approx. 86% when the angle ($\theta$) is +4°, and approx. 62% when the angle ($\theta$) is +12° compared to areas before the optical axis tilts and thereby, the front reflection brightness and entrance angularity are deteriorated.

Figure 7:
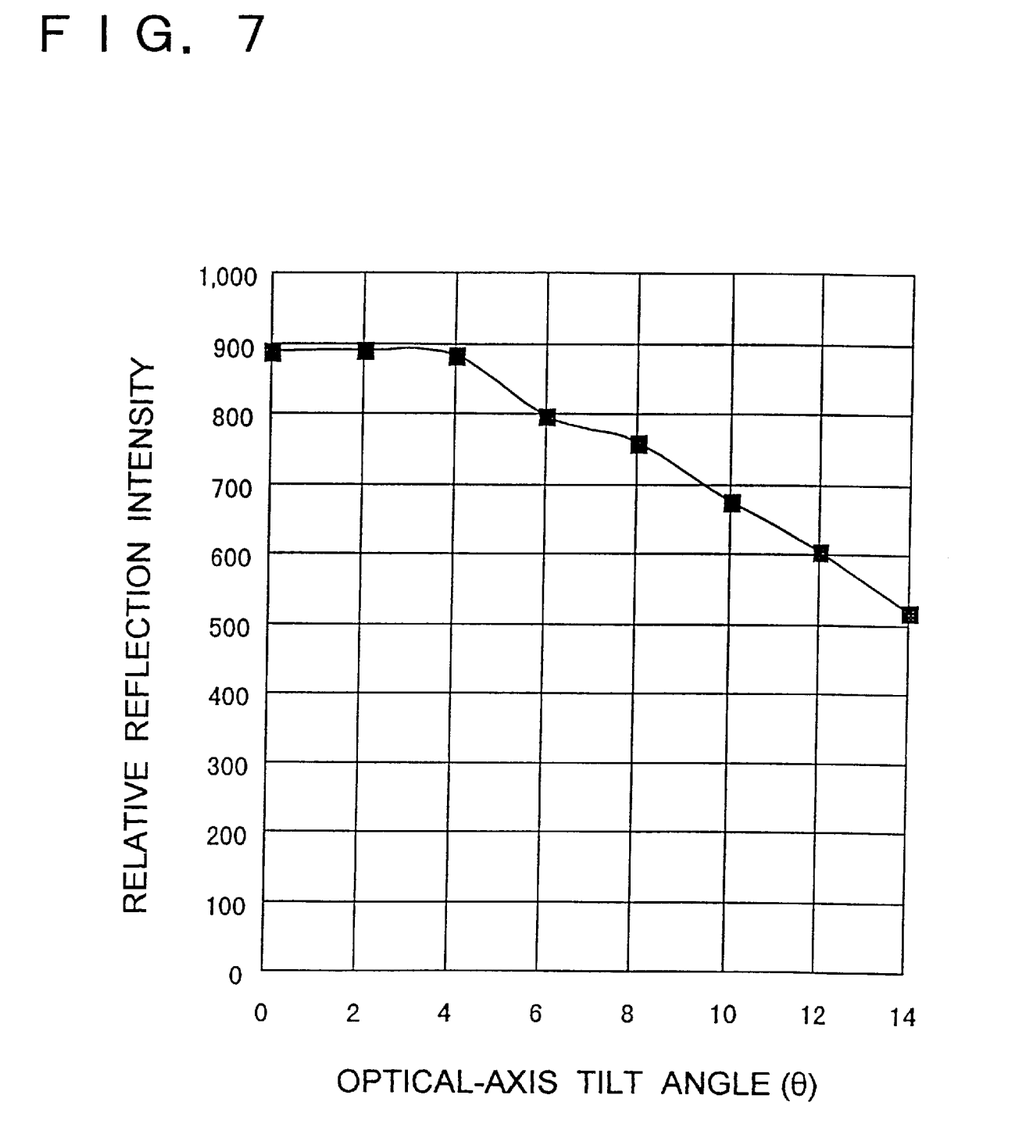
FIG. 7 is a graph showing the relation between optical-axis tilt angle (θ) and brightness observed from the front calculated through ray tracing simulation.

It is possible to confirm the deterioration of the front brightness due to decrease of the area ratio through geometric ray-tracing computer simulation. FIG. 7 shows the front brightness of a triangular-pyramidal reflective element of the prior art calculated by assuming the entrance angle as 0° and the observation angle as 0° when keeping the height (h) at 80 μm and changing optical-axis tilt angles ($\theta$) from 0° to +14°. Thus, it is found that the front brightness deteriorates as the tilt angle ($\theta$) increases.

In the case of a triangular-pyramidal reflective element of the present invention, however, it is possible to make areas of the lateral faces ($c_1$, $c_2$) larger than the lateral faces of a triangular-pyramidal reflective element formed by the prior art because the height (h') from the apexes ($H_1$, $H_2$) up to the common base (X-X') is designed so as to be substantially larger than the height (h) from the apexes ($H_1$, $H_2$) up to the virtual plane (Z-Z').

Therefore, in the case of a triangular-pyramidal reflective element of the present invention, it is possible to improve the disadvantage that the brightness is deteriorated due to decrease of the area of the face c of the triangular-pyramidal reflective element by tilting an optical-axis up to +3° or more in a direction in which (q–p) becomes plus. In the case of the present invention, it is preferable that an optical axis tilts so that the optical-axis tilt angle ($\theta$) ranges between +4° and +12°, particularly between +5° and +10°. A triangular-pyramidal reflective element having an optical-axis tilt angle ($\theta$) exceeding 12° is not preferable because the element is excessively deformed, the reflection brightness greatly depends on an angle at which light enters the element (that is, rotation angle), and thus the rotation angularity deteriorates.

In the case of a triangular-pyramidal reflective element, an optimum optical characteristic is obtained when the value of h'/h ranges between 1.05 and 1.5, more preferably ranges between 1.07 and 1.4. Because areas of the lateral faces ($c_1$, $c_2$) sharing the base of a triangular-pyramidal reflective element meeting the above values of h'/h can have almost equal areas for areas of two other lateral faces ($a_1$, $b_1$, and $a_2$, $b_2$), it is possible to increase light which are retroreflected due to trihedral reflection.

Because three lateral faces ($a_1$, $b_1$, $c_1$) of a triangular-pyramidal reflective element of the present invention is not greatly changed in the area ratio viewed from the front or the area ratio viewed from the entrance axis direction, the triangular-pyramidal reflective element is improved in both front brightness characteristic and entrance angularity.

Moreover, when the value of h'/h is equal to or less than 1.0, particularly when the value is less than 1.05, increase rates of the areas of the faces $c_1$ and $c_2$ are not very remarkable. However, when the value of h'/h exceeds 1.4, the ratio between the areas of two other lateral faces ($a_1$, $b_1$ and $a_2$, $b_2$) decreases compared to the areas of the lateral faces ($c_1$, $c_2$) sharing a base, it is difficult to improve optical characteristics because of the reason same as the above.

It is preferable that the height (h) from the apexes ($H_1$, $H_2$) of a triangular-pyramidal reflective element of the present invention up to the virtual plane (Z-Z') of the triangular-pyramidal reflective element ranges between 50 and 400 μm and it is more preferable that the height (h) ranges between 60 and 200 μm. When the height (h) is less than 50 μm, the size of the element is extremely decreased. Therefore, dispersion of retroreflective light becomes excessive due to the diffraction effect determined by the base-plane opening area of the element and thus, the front brightness characteristic is deteriorated. Moreover, the height (h) exceeding 400 μm is not preferable because the thickness of a sheet is extremely increased and a soft sheet is not easily obtained.

Moreover, three prism face angles formed when three lateral faces ($a_1$, $b_1$, $c_1$) or ($a_2$, $b_2$, $c_2$) serving as prismatic faces of a triangular-pyramidal reflective element of the present invention intersect each other substantially form right angles. However, it is not always necessary to form a strict right angle (90°). It is also possible to provide a very small angle deviation for the prism face angles. By providing a very slight angle deviation for the prism face angles, it is possible to properly disperse the light reflected from an obtained triangular-pyramidal reflective element. However, when excessively increasing the angle deviation, the retroreflective performance is deteriorated because the light reflected from the obtained triangular-pyramidal reflective element is excessively dispersed. Therefore, it is preferable to keep at least one prism face angle formed when these three lateral faces ($a_1$, $b_1$, $c_1$) or ($a_2$, $b_2$, $c_2$) intersect each other between 89.5° and 90.5° in general or preferably between 89.7° and 90.3°.

A triangular-pyramidal cube-corner retroreflective sheet of the present invention can be generally manufactured by using a cube-corner forming mold in which shapes of the above-described triangular-pyramidal reflective elements are arranged in a close-packed state on a metallic belt as reversed concave shapes, hot-pressing a proper soft resin sheet superior in optical transparency and uniformity against the forming mold, and reversing the shape of the mold and transferring the reversed shape to the resin sheet.

A typical method for manufacturing the above cube-corner forming mold is described in, for example, Stamm's U.S. Pat. No. 3,712,706 in detail. Also in the case of the present invention, it is possible to use a method according to the above method.

Specifically, for example, a microprism master block in which convex very-small triangular pyramids are arranged in a close-packed state by cutting parallel grooves whose groove depths (h) are equal and whose sectional form are V-shaped on a base material with a flatly-ground surface by using a super-hard tool (e.g. diamond-tipped tool or tool made of tungsten carbide) with a point angle of 73.4 to 81.0° and thereby, determining a repetitive pitch, groove depth (h), and mutual crossing angle in each of two directions (z-direction and w-direction in FIG. 3) correspondingly to the shape of a purposed triangular-pyramidal reflective element and then, using a similar super-hard tool with a point angle of 64.5 to 46.5° and thereby, cutting V-shaped parallel grooves on the base material in a third direction (x-direction) at a repetitive pitch (repetitive pitch of the line x in FIG. 3) passing through the intersection between the formed x- and w-directional grooves so as to divide the supplementary angle of the crossing angle between these two directions (in this case, the acute angle is referred to as the crossing angle) into two equal angles. In this case, in the case of the present invention, the x-directional groove depth (h') is made larger than the w-directional groove depth (h).

In the case of a preferred mode of the present invention, the z- and w-directional repetitive pitches range between 100 and 810 μm, the groove depth (h) ranges between 50 and 400 μm, the mutual crossing angle ranges between 43 and 55°, and the x-directional depth (h') ranges between 75 and 600 μm.

In general, these x-, w-, and z-directional grooves are cut so that the cross section of each groove becomes a isosceles triangle. However, it is also possible to cut these three-directional grooves so that the cross section of at least one of these directional grooves is slightly shifted from the isosceles triangle. As specific methods for cutting the grooves, it is possible to list a method of cutting the grooves by a tool whose front-end shape is asymmetric to right and left and a method of cutting the grooves by slightly tilting a tool symmetric to right and left. Thus, by slightly shifting the cross section of a groove from an isosceles triangle, it is possible to provide a very-slight angle deviation from a right angle (90°) for at least one of the prism face angles of three lateral faces ($a_1$, $b_1$, $c_1$) or ($a_2$, $b_2$, $c_2$) of an obtained triangular-pyramidal reflective element and thereby, it is possible to properly disperse the light reflected from the triangular-pyramidal reflective element from a complete retroreflective direction.

It is preferable to use a metal having a Vickers hardness (JIS Z 2244) of 350 or more, particularly 380 or more as the base material preferably usable for fabrication of the microprism master block. Specifically, it is possible to use one of amorphous copper, electrolysis nickel, and aluminum. As an alloy-based material, it is possible to use one of copper-zinc alloy (brass), copper-tin-zinc alloy, nickel-cobalt alloy, nickel-zinc alloy, and aluminum alloy.

Moreover, it is possible to use a synthetic resin as the base material. However, it is necessary to avoid using a synthetic resin which causes a trouble that the resin cannot be accurately cut because it is softened under cutting. Therefore, it is preferable to use a material made of a resin having a glass transition point of 150° C. or higher, particularly having a glass transition point of 200° C. or higher and a Rockwell hardness (JIS Z 2245) of 70 or more, particularly 75 or more. Specifically, it is possible to use one of a polyethylene-terephthalate-based resin, polyethylene-phthalate-based resin, polycarbonate-based resin, polymethly-methacrylate-based resin, polyimide-based resin, polyarylate-based resin, polyether-sulfone-based resin, polyether-imide-based resin, and cellulose-triacetate-based resin.

A flat plate can be formed with one of the above synthetic resins by a normal resin forming method such as an extrusion forming method, calendar forming method, or solution casting method and moreover, it is possible to perform treatments such as heating and extending according to necessity. It is possible to apply a preliminary conducting treatment to the plane of the flat plate thus formed in order to simplify the conducting treatment and/or electroforming treatment when making an electroformed mold from the prism master block manufactured by the above method. As the preliminary conducting treatment, it is possible to use the vacuum deposition method for vacuum-depositing metals such as gold, silver, copper, aluminum, zinc, chromium, nickel, and selenium, cathode sputtering method using these metals, or electroless plating method. Moreover, it is possible to provide the conductivity for the flat plate by blending the conductive powder of carbon black or the like or organic metallic salt with a synthetic resin.

Then, electroforming is applied to the surface of the obtained microprism master block and a metallic film is formed on the surface. By removing the metallic film from the surface of the master block, it is possible to make a metallic mold for forming a triangular-pyramidal corner-cube retroreflective sheet of the present invention.

When using a metallic microprism master block, it is possible to clean the surface of the die according to necessity and thereafter, immediately apply the electroforming to the surface. However, when using a synthetic-resin microprism master block, it is necessary to apply the conducting treatment for providing conductivity for the prism surface of a master block before applying the electroforming to the surface. As the conducting treatment, it is possible to use one of the silver mirror treatment, electroless plating treatment, vacuum deposition treatment, and cathode sputtering treatment.

As the silver mirror treatment, it is specifically possible to use a method of cleaning the surface of the master block formed by the above method with an alkaline detergent to remove dirt such as oil component from the surface, thereafter activating the surface with a surface active agent such as tannic acid, and quickly transforming the surface into a silver mirror by using a silver nitrate solution. The sliver-mirror transformation can use the spraying method using a double-cylinder nozzle for a silver nitrate solution and a reducing-agent (e.g. glucose or glyoxal) solution or the soaking method for soaking a master block in a mixed solution of a silver nitrate solution and a reducing agent solution. Moreover, it is preferable that the thickness of a silver mirror film is as thin as possible as long as the conductivity under electroforming is kept and therefore, for example, a thickness of 0.1 μm or less is preferable.

Electroless plating uses copper and nickel. An electroless nickel plating solution can use nickel sulfate or nickel chloride as a water-soluble metallic salt of nickel. A plating solution is obtained by adding a solution mainly containing citrate or malate to the solution as a complexing agent and moreover adding sodium hypophosphite, sodium hydrogen boride, or amine borane to the solution as a reducing agent.

The vacuum deposition treatment can be performed by cleaning the surface of a master block and then putting the master block in a vacuum device, heating and vaporizing a metal such as gold, silver, copper, aluminum, zinc, nickel, chromium, or selenium, precipitating the metal on the cooled mother-die surface, and forming a conductive film on the surface, similarly to the case of the silver mirror treatment. Moreover, the cathode sputtering treatment can be performed by putting a master block treated similarly to the case of the vacuum deposition treatment in a vacuum device in which a flat cathode plate for mounting a desired metallic foil on it and a metallic anode table made of aluminum or iron for mounting a material to be treated on it and putting the master block on the anode table, setting a metallic foil same as the foil used for the vacuum deposition to a cathode, electrifying the foil to cause glow discharge, making a cation flow generated by the glow discharge collide with the metallic foil on the cathode and thereby evaporating metallic atoms or particulates, and precipitating the atoms or particulates on the mother-die surface and forming a conductive film on the surface. It is preferable that a conductive film formed by one of these methods has a thickness of 300 Å.

To form a smooth and uniform electroformed film on a prism master block made of a synthetic resin, it is necessary to uniformly apply the conducting treatment to the entire surface of the master block. When the conducting treatment is ununiformly applied, a trouble may occur that the smoothness of the surface of an electroformed layer at a portion with inferior conductivity deteriorates or no electroformed layer is formed but a defective portion is formed.

To avoid the above trouble, it is possible to use a method of improving the wetting of a silver mirror solution by treating a treatment surface with a solvent such as alcohol immediately before starting the silver mirror treatment. However, because a prism master block made of a synthetic resin formed for the present invention has a very-deep acute-angle concave portion, wetting is not completely improved. The trouble of a conductive film due to the concave shape also easily occurs in the vacuum deposition treatment.

To uniform the surface of an electroformed layer obtained through electroforming, activation treatment is frequently performed. As the activation treatment, it is possible to use a method of soaking the electroformed layer in a sulfamic acid solution of 10 wt %.

When electroforming a master block made of a synthetic resin to which the silver mirror treatment is applied, a sliver layer is integrated with an electroformed layer and easily removed from the synthetic-resin master block. However, when forming a conductive film of nickel through the electroless-plating or cathode-sputtering treatment, it may be difficult to separate an electroformed layer after electroforming from a synthetic-resin layer because the synthetic-resin surface well adheres to the conductive film. To avoid the above trouble, it is necessary to apply the so-called separation treatment such as chromate treatment to the surface of the conductive film layer before starting electroforming. In this case, the conductive film layer remains on the synthetic-resin layer after separation.

The synthetic-resin prism master block with a conductive film layer formed on it undergoes the above various pretreatments and thereafter, an electroformed layer is formed on the conductive film layer through electroforming. In the case of a prism master block made of a metal, the surface is cleaned and then, an electroformed layer is formed directly on the metal.

Electroforming is generally performed in an aqueous solution of 60 wt % of sulfamic acid at a temperature of 40° C. and a current of approx. 10 A/dm$^2$. A uniform electroformed layer is easily obtained by setting an electroformed-layer forming rate to, for example, 48 hr/mm or less. At a forming rate of higher than 48 hr/mm, a trouble easily occurs that the surface smoothness is lost or a defective portion occurs in the electroformed layer.

Moreover, it is possible to perform nickel-cobalt-alloy electroforming in which a component such as cobalt is added to the alloy in order to improve the frictional characteristic of the surface of a mold. By adding 10 to 15 wt % of cobalt, it is possible to harden the Vickers hardness Hv of an obtained electroformed layer up to 300 to 400. Therefore, to manufacture a triangular-pyramidal cube-corner retroreflective sheet of the present invention by using an obtained electroformed mold and thereby forming a synthetic resin, it is possible to improve the durability of the mold.

Thus, a first-generation electroformed mold formed from a prism master block can be repeatedly used as an electroformed master used to further form a second-generation electroformed mold. Therefore, it is possible to form a plurality of electroformed molds from one prism master block.

The electroformed master blocks thus formed are accurately cut and then, they can be used by combining and joining them up to a final mold size for forming a microprism sheet made of a synthetic resin. To join the master blocks, it is possible to use a method of making cut ends butt each other or a method of welding a combined joined portion by, for example, electron beam welding, YAG laser welding, or $CO_2$ laser welding.

The combined electroformed mold is used to form a synthetic resin as a synthetic-resin forming mold. As the synthetic resin forming method, it is possible to use compression molding or injection molding.

The compression molding can be performed by inserting a formed thin-wall nickel electroformed mold, a synthetic resin sheet having a predetermined thickness, and a silicone-rubber sheet having a thickness of approx. 5 mm as a cushion material into a compression molding press heated up to a predetermined temperature and then, preheating them for 30 sec at a pressure of 10 to 20% of a forming pressure and heating and pressurizing them for approx. 2 min at a temperature of 180 to 250° C. and a pressure of 10 to 30 kg/cm. Thereafter, by cooling them up to room temperature while keeping them pressurized and releasing the pressure, it is possible to obtain a molded prism.

Moreover, it is possible to obtain a continuous sheet-like product by joining thin-wall electroformed molds having a thickness of approx. 0.5 mm formed by the above method to form an endless belt mold, setting the belt mold onto a pair of rollers comprising a heating roller and a cooling roller to rotate it, supplying a melted synthetic resin to the belt mold present on the heating roller in the form of a sheet to pressure-form the melted synthetic resin with one silicone roller or more, thereafter cooling the resin up to the glass transition temperature or lower on the cooling roller, and separating it from the belt mold.

Figure 8:
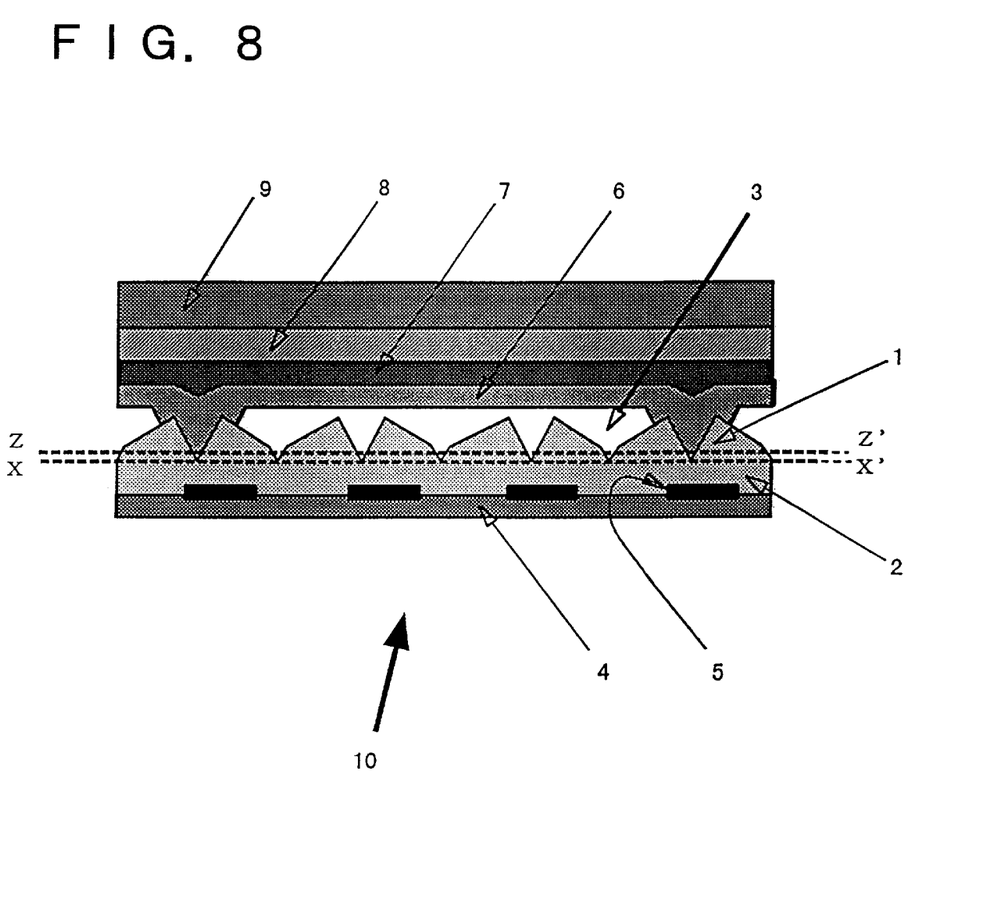
FIG. 8 is a sectional view showing the structure of one embodiment of a triangular-pyramidal cube-corner reflective sheet of the present invention.

Then, a mode of the structure of a cube-corner retroreflective sheet of the present invention is described below by referring to FIG. 8 showing a sectional view of the structure.

In FIG. 8, symbol 1 denotes a reflective element layer on which triangular-pyramidal reflective elements ($R_1$, $R_2$) of the present invention are arranged in a close-packed state, 2 denotes a holding body layer for holding reflective elements, and 10 denotes a light entrance direction. The reflective element layer (1) and the holding body layer (2) are normally united into one body. However, it is also possible to form the layers by superimposing separate layers each other. In accordance with a purpose and an operating environment of a retroreflective sheet of the present invention, it is possible to use a surface protective layer (4), a printing layer (5) for communicating information to an observer or coloring a sheet, a binder layer (6) for realizing an airtight structure for preventing moisture from entering the back of a reflective element layer, a support layer (7) for supporting the binder layer (6), and an adhesive layer (8) and a separating material layer (9) used to attach the retroreflective sheet to other structure.

It is possible to use the resin same as that used for the retroreflective element layer (1) for the surface protective layer (4). Moreover, to improve the weather resistance, it is possible to use an ultraviolet absorbent, light stabilizer, and oxidation inhibitor independently or by combining them. Moreover, it is possible to make the resin contain various organic pigments, inorganic pigments, and dyes serving as coloring agents.

It is possible to normally set the printing layer (5) between the surface protective layer (4) and the holding body layer (2) or on the surface protective layer (4) or the reflection surface of the reflective element (1) by such means as gravure, screen printing, or ink-jet printing.

Though a material constituting the reflective element layer (1) and the holding body layer (2) is not restricted as long as the material meets flexibility which is one of the objects of the present invention, it is preferable to use a material having optical transparency and uniformity. The following resins can be listed as materials usable for the present invention: polycarbonate resin, vinyl chloride resin, (meth)acrylic resin, epoxy resin, polystyrene resin, polyester resin, fluorocarbon resin, polyolefin resin such as polyethylene resin or polypropylene resin, cellulose resin, and polyurethane resin.

In the case of the reflective element layer (1) of the present invention, it is general to set an air layer (3) to the back of a cube-corner retroreflective element in order to increase a critical angle meeting an internal total reflective condition. To prevent a trouble such as decrease of a critical angle due to entrance of moisture or corrosion of a metallic layer under an operating condition, it is preferable that the reflective element layer (1) and the support layer (7) are sealed by the binder layer (6). As the method for sealing the layers, it is possible to use the methods disclosed in U.S. Pat. Nos. 3,190,178 and 4,025,159 and Japanese Utility Model Laid-Open No. Sho 50-28669. The binder layer (6) can use any one of (meth)acrylic resin, polyester resin, alkyd resin, and epoxy resin. As the joining method, it is possible to properly use any one of the publicly-known thermally-fusible-resin joining method, thermosetting-resin joining method, ultraviolet-curing-resin joining method, and electron-beam-curing-resin joining method.

It is possible to apply the binder layer (6) used for the present invention to the entire surface of the support layer (7) or selectively set the layer (6) to the joint with a retroreflective element layer by a method such as the printing method. As a material for forming the support layer (7), it is possible to use a resin for forming a retroreflective element layer, a general resin capable of forming a film, fiber, cloth, and a metallic foil or plate of stainless steel or aluminum independently or by combining them.

For the adhesive layer (8) used to attach a retroreflective sheet of the present invention to a metallic plate, wooden plate, glass plate, or plastic plate and the separation layer (9) for the adhesive, it is possible to properly select publicly-known materials.

EMBODIMENTS

The present invention is further specifically described below in accordance with embodiments.

Embodiment 1

Parallel grooves having a V-shaped sectional form are cut on a brass plate of 100-mm square with a flatly-ground surface in the first direction (z direction in FIG. 3) and the section direction (w direction in FIG. 3) at a repetitive pattern through the fly cutting method by using a diamond-tipped tool having a point angle of 77.89° so that the repetitive pitch in z and w directions becomes 163.64 μm, the groove depth (h) becomes 80 μm, and the crossing angle between lines z and w shown by ∠A-$K_1$-B in FIG. 5 becomes 49.22°.

Thereafter, a master block in which a plurality of convex triangular-pyramidal cube corners with a height (h) of 80 μm from the virtual plane (Z-Z') of a triangular-pyramidal reflective element are arranged in a close-packed state is formed on a brass plate by using a diamond-tipped tool with a point angle of 54.53° and thereby cutting V-shaped parallel grooves in the third direction (x direction) so that the repetitive pitch (repetitive pitch of the line x in FIG. 3) becomes 196.46 μm, the groove depth (h') becomes 90 μm, and the crossing angle between the third direction and the first direction and that between the third direction and second direction become 65.39° respectively. The optical-axis tilt angle θ of the triangular-pyramidal reflective elements is +8° and each of prism face angles of three faces forming a triangular pyramid is 90°. Moreover, h'/h is 90/80=1.125.

A concave cube-corner forming mold made of nickel and having a reversed shape is formed by the brass master block through the electroforming method. By using the forming mold, a polycarbonate-resin triangular-pyramidal cube-corner retroreflective sheet in which cube corners in which a support layer has a thickness of approx. 250 μm, h=80 μm and h'=90 μm, and prism face angles of three faces forming a triangular pyramid do not have any angle deviation are arranged in a close-packed state is formed on the surface of a polycarbonate-resin sheet having a thickness of 300 μm {"YUPIRON (transliterated) E2000" made by MISTUSBISHI ENGINEERING PLASTICS (transliterated) Co., Ltd.} by compression-molding the polycarbonate sheet at a molding temperature of 200° C. and a molding pressure of 50 kg/cm² and thereafter, cooling the sheet up to 30° C. while pressurized and taking out the sheet.

Embodiment 2

A groove having a V-shaped sectional form is cut on a brass plate of 100-mm square with a flatly-ground surface through the fly cutting method by using a diamond-tipped tool whose point angle is 77.81° in the first direction (z direction) and the second direction (w direction) and 54.45° in the third direction (x direction) so that the repetitive pitch in the first and second directions becomes 163.64 μm, the depth (h) of a cut groove becomes 80 μm, the crossing angle between the first and second directions becomes 49.22° and moreover, the repetitive pitch in the third direction becomes 196.46 µm and the depth (h') of a cut groove becomes 90 µm to form a master block in which a plurality of convex triangular-pyramidal cube corners in which the height (h) of a triangular-pyramidal reflective element from the virtual plane (Z-Z') is 80 µm are arranged on the brass plate in a close-packed state. The optical-axis tilt angle θ of the triangular-pyramidal reflective element is 8° and each of the prism face angles of three faces forming a triangular pyramid is 89.92°. Moreover, h'/h is 90/80=1.125.

Moreover, similarly to the case of the embodiment 1, a cube-corner forming mold made of nickel is formed to form a polycarbonate triangular-pyramidal cube-corner retroreflective sheet in which cube corners in which the thickness of a support layer is approx. 250 µm, h=80 µm and h'=90 µm, and prism face angles of three faces forming a triangular pyramid have a very small angle deviation are arranged in a close-packed state on the surface of a polycarbonate resin sheet same as that of the embodiment 1 by compression-molding the sheet under the same conditions as the case of the embodiment 1.

Comparative Example 1

A groove with a V-shaped sectional form was cut on a brass plate of 100-mm square with a flatly-ground surface at a repetitive pattern through the fly cutting method so that the repetitive pitch in the first direction (z direction) and the second direction (w direction) becomes 181.24 µm and the repetitive pitch in the third direction (x direction) becomes 160.29 µm, and the crossing angle between the first and second directions becomes 68.86° by using a diamond-tipped tool whose point angle is 61.98° in the first and second directions and 86.53° in the third direction to form a master block in which a plurality of convex triangular-pyramidal cube corners with a cube-corner retroreflective element having a height of 80 µm are arranged on the brass plate in a close-packed state. The optical-axis tilt angle θ of the reflective element was −8° and each of the prism face angles of three faces forming a triangular pyramid was 90°.

A polycarbonate-resin triangular-pyramidal cube-corner retroreflective sheet was formed through the same method as the case of the embodiment 1.

Comparative Example 2

A groove with a V-shaped sectional form was cut on a brass plate of 100-mm square with a flatly-ground surface at a repetitive pattern through the fly cutting method so that the repetitive pitch in the first direction (z direction) and the second direction (w direction) becomes 166.92 µm and the repetitive pitch in the third direction (x direction) becomes 177.23 µm, and the crossing angle between the first and second directions becomes 56.18° by using a diamond-tipped tool whose point angle is 77.34° in the first and second directions and 64.53° in the third direction to form a master block in which a plurality of convex triangular-pyramidal cube corners with a reflective element having a height of 80 µm are arranged on the brass plate in a close-packed state. The optical-axis tilt angle θ of the reflective element was +3° and each of the prism face angles of three faces forming a triangular pyramid was 90°.

A polycarbonate-resin triangular-pyramidal cube-corner retroreflective sheet was formed through the same method as the case of the embodiment 1.

Table 1 shows measured data for retroreflection brightnesses of the triangular-pyramidal cube-corner retroreflective sheets formed for the above embodiments 1 and 2 and comparative examples 1 and 2 {the unit of each reflection brightness is $(cd/Lx*m^2)$}. The retroreflective sheets of the embodiment 1 and comparative example 2 respectively show a high reflection brightness in a wide range. However, the reflective sheet of the comparative example 1 has a large brightness change particularly at an entrance angle of 5° to 10° and the reflective sheet of the comparative example 2 has a large brightness drop at an entrance angle of 30°. Therefore, any comparative example is inferior to the embodiments in entrance angularity.

TABLE 1

| Entrance angle (Degree) | Observation angle (Degree) | Embodiment 1 | Embodiment 2 | Comparative example 1 | Comparative example 2 |
|---|---|---|---|---|---|
| 5 | 0.2 | 890 | 830 | 770 | 869 |
|   | 0.33 | 220 | 250 | 158 | 185 |
| 10 | 0.2 | 810 | 820 | 580 | 800 |
|   | 0.33 | 200 | 230 | 140 | 164 |
| 30 | 0.2 | 595 | 620 | 490 | 440 |
|   | 0.33 | 180 | 186 | 110 | 134 |

What is claimed is:

1. A triangular-pyramidal cube-corner retroreflective sheet characterized in that triangular-pyramidal cube-corner retroreflective elements protruded on one common base plane (X-X') are arranged on said base plane (X-X') in a close-packed state so as to face each other by sharing one common base edge on said base plane (X-X') with each other, the base plane (X-X') is one common plane including a plurality of base edges (x, x, . . . ) shared by said triangular-pyramidal retroreflective elements, two these triangular-pyramidal retroreflective elements facing each other form an element pair of substantially same shapes facing each other so as to be respectively substantially symmetric to planes (Y-Y', Y-Y', . . . ) vertical to said base plane (X-X') including said common base edges (x, x, . . . ) on said base plane (X-X'), said triangular-pyramidal retroreflective elements are formed with substantially same pentagonal lateral faces ($c_1$, $c_2$) using said common base edges (x, x, . . . ) as one side and substantially same quadrangular lateral faces ($a_1$, $b_1$; $a_2$, $b_2$) substantially perpendicularly intersecting said face $c_1$ or $c_2$ using two upper sides of said face $c_1$ or $c_2$ using apexes ($H_1$, $H_2$) of said triangular-pyramidal retroreflective elements as starting points as one side respectively, sharing one of ridge lines of said triangular-pyramidal retroreflective elements and using said ridge line as one side and the height (h') from the apexes ($H_1$, $H_2$) of said triangular-pyramidal retroreflective elements up to said base plane (X-X') including the base edges (x, x, . . . ) of the pentagonal lateral faces ($c_1$, $c_2$) of said triangular-pyramidal retroreflective elements is substantially larger than the height (h) from the apexes ($H_1$, $H_2$) of said triangular-pyramidal retroreflective elements up to a substantially horizontal plane (virtual plane Z-Z') including base edges (z, w) of other lateral faces ($a_1$, $b_1$; $a_2$, $b_2$) of said triangular-pyramidal retroreflective elements.

2. A triangular-pyramidal cube-corner retroreflective sheet characterized in that triangular-pyramidal cube-corner retroreflective elements protruded on one common base plane (X-X') are arranged in a close-packed state so as to face each other by sharing one common base edge on said base plane (X-X'), said base plane (X-X') is a common plane including the base edges (x, x, . . . ) shared by said triangular-pyramidal reflective elements, two these triangular-pyramidal reflective elements facing each other form a pair of substantially-same-shape elements facing each other so as to be respectively substantially symmetric to planes (Y-Y', Y-Y', . . . ) vertical to said base plane (X-X') including said common base edges (x, x, . . . ) on said base plane (X-X'), lateral faces ($c_1$, $c_2$) of said triangular-pyramidal reflective elements using said common base edges (x, x, . . . ) as one side are continuously arranged along said common base edges (x, x, . . . ) by respectively forming a substantially same pentagon, two other lateral faces ($a_1$, $b_1$ and $a_2$ $b_2$) constituting said triangular-pyramidal reflective elements respectively form a substantially same quadrangular lateral face using the two upper sides of said face $c_1$ or $c_2$ using the apexes ($H_1$, $H_2$) of said triangular-pyramidal reflective elements as starting points as one side and sharing one of the ridge lines of said triangular-pyramidal reflective elements and using said ridge line as one side, a plane (virtual plane Z-Z') including base edges (z, w) of said lateral faces ($a_1$, $b_1$) formed by the fact that the lateral faces ($a_1$, $b_1$) of said quadrangle intersect the corresponding quadrangular lateral face ($a_2$ or $b_2$) of other triangular-pyramidal reflective elements adjacent to said lateral faces ($a_1$, $b_1$) is substantially parallel with said base plane (X-X') and located substantially upper than the base plane (X-X'), and the optical axis of said triangular-pyramidal reflective elements forms at least an angle of 3° from said vertical plane (Y-Y') in the direction in which the difference (q−p) between the distance (q) from the intersection between the optical axis of said triangular-pyramidal reflective elements and said base plane (X-X') up to the base edges (x, x, . . . ) shared by said element pair and the distance (p) from the intersection (P) between a perpendicular extended from the apexes ($H_1$, $H_2$) of said elements to said base plane (X-X') and said base plane (X-X') up to the base edges (x, x, . . . ) shared by said elements becomes plus.

3. The cube-corner retroreflective sheet according to claim 1 or 2, wherein the value of h'/h ranges between 1.05 and 1.5 when assuming the height of apexes ($H_1$, $H_2$) of triangular-pyramidal cube-corner retroreflective elements from the base plane (X-X') of said elements as h' and the height of said apexes ($H_1$, $H_2$) from said virtual plane (Z-Z') as h.

4. The cube-corner retroreflective sheet according to claim 1 or 2, wherein the value of h'/h ranges between 1.07 and 1.4 when assuming the height of apexes ($H_1$, $H_2$) of triangular-pyramidal cube-corner retroreflective elements from the base plane (X-X') of said elements as h' and the height of said apexes ($H_1$, $H_2$) from said virtual plane (Z-Z') as h.

5. The cube-corner retroreflective sheet according to any one of claims 1 or 2, wherein the optical axis a triangular-pyramidal reflective element tilts by 4° to 12° from said vertical plane (Y-Y') in a direction in which the difference (q−p) between the distance (p) from the intersection (P) between a perpendicular extended from apexes ($H_1$, $H_2$) of triangular-pyramidal cube-corner retroreflective elements to a base plane (X-X') and said base plane (X-X') up to one of the base edges (x, x, . . . ) shared by said element pair and the distance (q) from the intersection (Q) between the optical axis of said triangular-pyramidal reflective elements and said base plane (X-X') up to the base edges (x, x, . . . ) shared by said element pair become plus.

6. The cube-corner retroreflective sheet according to any one of claims 1 or 2, wherein the optical axis a triangular-pyramidal reflective element tilts by 5° to 10° from said vertical plane (Y-Y') in a direction in which the difference (q−p) between the distance (p) from the intersection (P) between a perpendicular extended from apexes ($H_1$, $H_2$) of triangular-pyramidal cube-corner retroreflective elements to a base plane (X-X') and said base plane (X-X') up to one of the base edges (x, x, . . . ) shared by said element pair and the distance (q) from the intersection (Q) between the optical axis of said triangular-pyramidal reflective elements and said base plane (X-X') up to the base edges (x, x, . . . ) shared by said element pair become plus.

7. The cube-corner retroreflective sheet according to any one of claims 1 or 2, wherein the distance (h) from a plane (virtual plane Z-Z') including a plurality of base edges (z, w) of quadrangular lateral faces ($a_1$, $b_1$ or $a_2$, $b_2$) formed by the fact that the substantially same quadrangular lateral faces ($a_1$, $b_1$) sharing one of ridge lines starting with apexes ($H_1$, $H_2$) of a plurality of triangular-pyramidal cube-corner retroreflective elements protruded onto a common base plane (X-X') as one side intersect the corresponding quadrangular lateral face ($a_2$ or $b_2$) of their adjacent other triangular-pyramidal reflective element up to the apexes ($H_1$, $H_2$) of said triangular-pyramidal reflective element ranges between 50 $\mu$m and 400 $\mu$m.

8. The cube-corner retroreflective sheet according to any one of claims 1 or 2, wherein the distance (h) from a plane (virtual plane Z-Z') including a plurality of base edges (z, w) of quadrangular lateral faces ($a_1$, $b_1$ or $a_2$, $b_2$) formed by the fact that the substantially same quadrangular lateral faces ($a_1$, $b_1$) sharing one of ridge lines starting with apexes ($H_1$, $H_2$) of a plurality of triangular-pyramidal cube-corner retroreflective elements protruded onto a common base plane (X-X') as one side intersect the corresponding quadrangular lateral face ($a_2$ or $b_2$) of their adjacent other triangular-pyramidal reflective element up to the apexes ($H_1$, $H_2$) of said triangular-pyramidal reflective element ranges between 60 $\mu$m and 200 $\mu$m.

9. The cube-corner retroreflective sheet according to any one of claims 1 or 2, wherein the magnitude of at least one prism face angle formed by the fact that three lateral faces ($a_1$, $b_1$, $c_1$) or ($a_2$, $b_2$, $c_2$) of a triangular-pyramidal cube-corner retroreflective element intersect each other is kept in a range of 89.5° to 90.5°.

10. The cube-corner retroreflective sheet according to any one of claims 1 or 2, wherein the magnitude of at least one prism face angle formed by the fact that three lateral faces ($a_1$, $b_1$, $c_1$) or ($a_2$, $b_2$, $c_2$) of a triangular-pyramidal cube-corner retroreflective element intersect each other is kept in a range of 89.7° to 90.3°.

\* \* \* \* \*